Dec. 9, 1952

F. L. HOLFORD 2,620,605

MOUNTING HEAD FOR ABRASIVE DISKS

Filed Nov. 22, 1950

INVENTOR.
FRANK L. HOLFORD

BY Fay, Golrick & Fay

ATTORNEYS

Patented Dec. 9, 1952 2,620,605

UNITED STATES PATENT OFFICE 2,620,605

MOUNTING HEAD FOR ABRASIVE DISKS

Frank L. Holford, Towson, Md., assignor to The Black & Decker Mfg. Co.

Application November 22, 1950, Serial No. 197,107

6 Claims. (Cl. 51—197)

Figure 1:
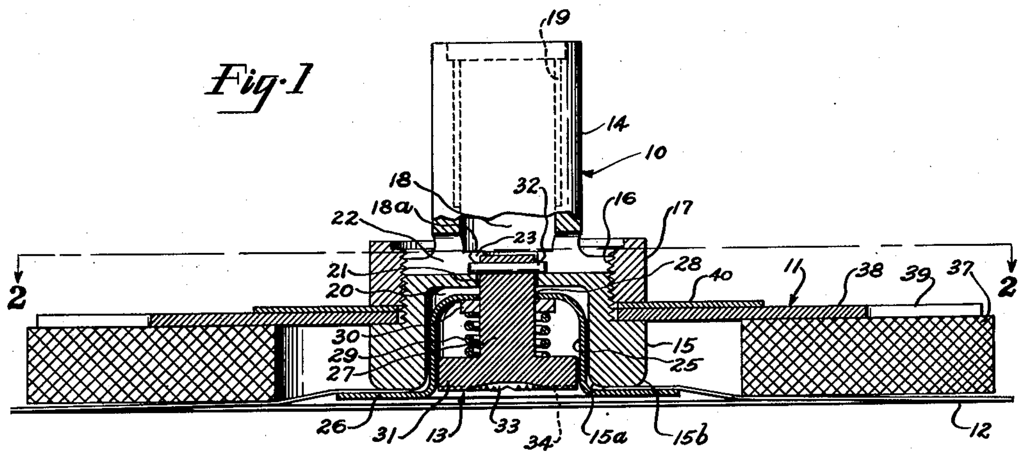

The present invention relates to improvements in mounting heads for abrasive disks and more particularly to improvements in devices commonly known as feather edgers.

Abrasive disk carriers comprising the disk cushion and supporting hub structure have taken many forms in commercial practice and usually the abrasive disk is clamped to the pad at its central region by a screw or nut-held washer. The pad structure usually terminates short of the center thereof to provide a well or space into which the central part of the disk is depressed somewhat by the washer. Some proposals have been made heretofore whereby the clamping washer could be removed in an expeditious manner to permit changing of a worn disk or to provide a means at the hub structure which would permit the disk to slip on the pad surface to a certain extent and thus avoid tearing or premature destruction of the disk.

The present invention contemplates a disk clamping means or mechanism which will permit the slipping of the disk relative to the pad and also serve as a quick change disk clamping mechanism which can be manually manipulated in a ready manner without the use of screw drivers, wrenches or other tools.

An object of the invention is the provision of a mounting head which is adapted to quick changing of the abrasive disks.

Another object is the provision of an abrasive disk mounting structure which resiliently supports the abrasive disks and which includes a quickly detachable hub mechanism which will clamp disk renewals with a uniformly predetermined friction pressure.

A further object is the provision of a mounting head adapted to quick changing of abrasive disk held thereon, which will allow the abrasive disk to slip relative to the support when a pre-determined cutting load is attained.

A further object is the provision of a feather edger of a design adapted to low cost manufacturing methods.

With the above and other objects in view, which will be apparent from the detailed description which follows, the invention consists in certain novel features of construction and combination of parts which will be readily understood by those skilled in the art to which the invention appertains. In the drawing which illustrates an embodiment of the invention—

Figure 2:
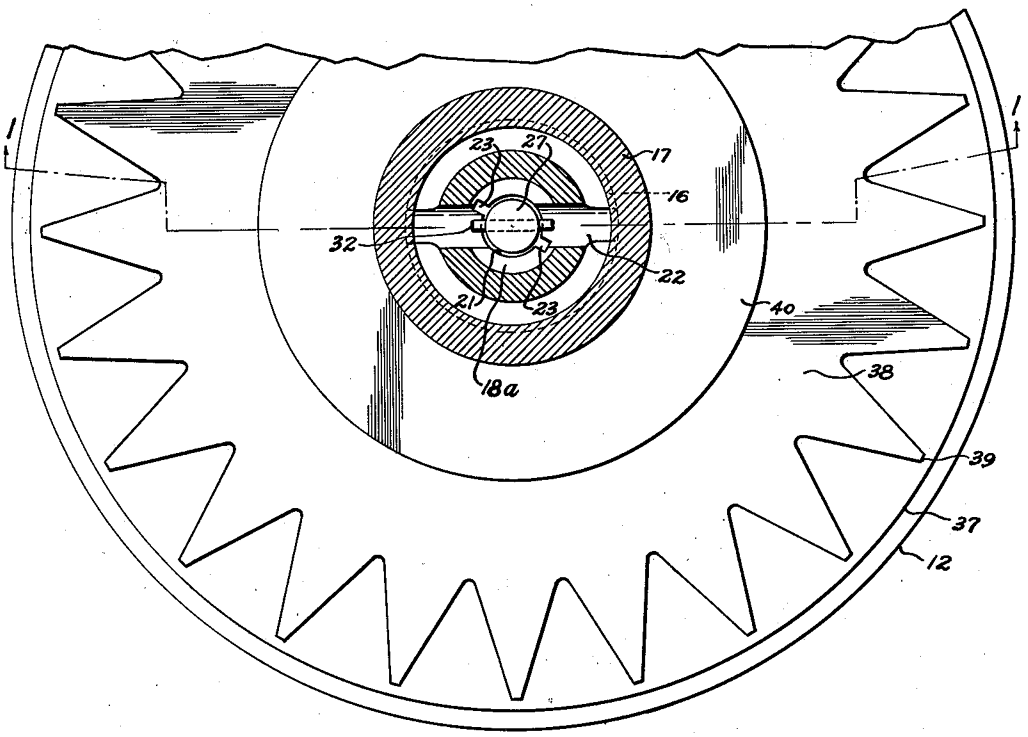

Fig. 1 is a sectional view taken through the axis of the sanding disk mounting head along the lines 1—1 of Fig. 2, showing the locking assembly in locked position; and Fig. 2 is a top plan view of the sanding disk mounting taken partly in section along the lines 2—2 of Fig. 1.

The mounting head of this invention comprises in general a hub structure 10, a resilient backing or supporting structure 11 for an annular abrasive disk 12 and a removable disk retainer and retainer locking assembly 13 which clamps the central portion of the abrasive disk against an end of the hub structure in a manner hereinafter explained, allowing slippage of the disk relative to the hub at a predetermined cutting load on the abrasive disk and also allowing quick changing of abrasive disks.

The hub structure 10 comprises a hub sleeve 14, provided at one end with a circumferential flange 15 and an externally threaded portion 16 adjacent the flange, and a hub nut 17 on the threaded portion for clamping the hub portion of the backing structure 11 on the hub against the flange 15. Preferably the inner and outer edges 15_a_ and 15_b_ of the flange 15 are rounded as in Fig. 1. The threads on the hub sleeve are preferably directed so as to tighten under use. The upper end of the hub sleeve is axially bored at 18, the bore having a flat bottom 18_a_ and threads 19 or other suitable means for attachment to a driveshaft. To receive the retainer and locking assembly 13 the flanged end of the hub sleeve has a coaxial cylindrical recess or counterbore 20 and an axial bore 21 extending from the recess to the upper threaded bore 18 of the hub sleeve. A transverse channel 22 extending across the bottom of bore 18 and intersecting bore 21 is formed by drilling through the hub sleeve perpendicular to its axis. A pair of diametrically opposite slots, extending from the bottom of recess 20 to the bottom of bore 18, are formed in bore 21. These slots are positioned on a line angularly displaced from the direction of channel 22.

The abrasive disk retainer assembly 13 comprises a cup-shaped disk retainer 25 with an outwardly disposed circumferential flange 26 at its open end; a flanged or headed locking plunger 27 extending through a central aperture 28 in the retainer 25 and through the bore 21 of the hub sleeve; a spiral compression spring 29 and retainer thrust washer 30 disposed about the locking plunger 27 between the retainer 25 and the head 31 on the outer end of the locking plunger; and a pin 32 extending transversely through the inward end of locking plunger 27 and having such size that its projecting ends form a bayonet type locking structure in conjunction with the slots 23 for holding the disk retainer assembly in position. The outward face of locking plunger head 31 may be provided with a central recess 33 and a series of radial grooves 34 to offer purchase for turning the plunger by finger tip. An impregnated bearing material may be used for the thrust washer 30.

The resilient backing or support structure 11, by means of which the abrasive disk 12 is supported, is mounted to the hub, and comprises a pad 37 in the form of a flexible annular disk secured by suitable means to a resilient disk 38 notched at its outer circumference with a series of radially extending projections or fingers 39, and a steel disk 40 interposed between the disk 38 and the hub nut 17. Preferably the disk 38 is formed of vulcanized compressed fiber with the pad 37 of felt, and the two may be bonded together with a glue or cement. The thickness of the felt disk 37 should be sufficiently greater than the total thickness of flange 15, flange 26 and abrasive disk 12 to provide clearance between the locking assembly and the work. The steel disk 40 serves not only as a washer between the hub nut 17 and the disk 38, but has the particular function of stiffening the hub region of the backing structure, and thus may be made to overlap the inner portion of felt disk 37 as required to give the extent of central stiffness desired. The use of the notched circumference also results in an increased flexibility of the support at the outer edge of the backing structure.

This notched peripheral structure of the resilient disk 38 is of particular value since such a structure results in the application of a smaller normal force on the abrasive disk toward the edges. Thus, there is a decreased abrasive action toward the outer edges in consequence whereof no sharp line of demarcation is formed between the sanded and unsanded portions of the work surface. Also, the alternation of areas of varying pressure applied in the rim region of the abrasive disk by this notched structure results in faster cutting.

In changing disks, inward pressure is applied with a finger on the locking plunger head 31 moving locking plunger 27 axially inwardly against the loaded spiral compression spring 29, a slight twist (counter-clockwise in Fig. 1) being applied. The projecting ends of pin 32 are thereby carried up out of the arcuate bottom of channel 22 and turned to coincidence with slots 23, whereupon, as finger pressure is released, the locking plunger 27 moves outwardly under the force of spring 29, and thus the whole self-contained assembly 13 is released from the hub. After the release of the assembly 13, the transverse pin 32 holds the disk retainer 25 on the plunger against the force of the spring, so that the locking structure parts are retained in a unit assembly.

After the above described release of the disk retainer assembly, the disks are changed and the disk retainer is simply pushed back into the hub structure by pressure applied with a clockwise twist to locking plunger head 31, until the ends of pin 32 slip out of slots 23 and into channel 22 to hold locking plunger 27 in place. In this disk locking operation, the flange 26 of the disk retainer carries the abrasive disk 12 against the end of the hub and is there stopped, whereupon the locking plunger 27 moves inwardly with respect to the retainer to load the spiral spring 27. Thus, after the pin 32 slips into channel 22, the force of the loaded spring determines the clamping pressure exerted by the retainer flange 26 and the hub on the abrasive disk.

When this feather edger is overloaded in use, slipping occurs between the felt disk 37 and the abrasive disk thereby to decrease or halt the abrading action of the abrasive disk. This slippage involves slippage of the disk 12 upon the hub end as well as upon the felt pad. Hence, the axial force exerted by the loaded spring serves as the controlling factor for the load at which slipping occurs. For given dimensions of the locking system, the slippage point of loading is predetermined by the choice of spring stiffness and dimensions. Because of this means for controlling the torque which may be applied to the abrasive disk, a mounting head is provided with which disk rupturing may be avoided, burning of the work prevented and more sensitive control of the cutting attained.

This invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. In a mounting head for an abrasive disk, a hub, a retaining member to hold the central portion of an abrasive disk against the hub end, a locking plunger having one end headed and the other end extending through said retaining member and releasably engaging said hub, said retaining member being axially movable relative to and free to rotate with respect to said plunger, and compression spring means interposed between said retaining member and the head of said locking plunger and urging said retaining member toward said hub to hold an abrasive disk in frictional engagement with said hub, said spring means having the strength thereof chosen to limit the maximum torque which may be applied to the abrasive disk without rupture thereof.

2. In a mounting head for abrasive disks, a hub, an abrasive disk retainer to hold an abrasive disk in frictional engagement with the work end of the hub, the hub being provided with an axial bore and counter bore, said axial bore being provided with bayonet pin slots, said retainer having a concentric cup-shaped projection extending into said counter bore, a headed locking pin extending through the end of said projection into said axial bore and provided with bayonet pins cooperating with the said slots to hold said pin in the hub, and spring means disposed between the end of said projection and the head of said locking pin to urge said retainer toward the hub for clamping an abrasive disk against the hub end.

3. In a mounting head for abrasive disks, a hub, an abrasive disk retainer to hold an abrasive disk in frictional engagement with the work end of the hub, the hub being provided with an axial bore and counter bore, said axial bore being provided with bayonet pin slots, said retainer having a concentric cup-shaped cylindrical projection extending into said counter bore, a headed locking pin extending through the end of said projection into said axial bore and provided with bayonet pins cooperating with the said slots to hold said pin in the hub, said retainer being rotatable relative to said pin, the head of said locking pin being disposed within said projection of the retainer, and spring means disposed between the end of said projection and the head of said locking pin to urge said retainer toward the hub end.

4. In a mounting head for abrasive disks, a hub; an abrasive disk retainer to hold an abrasive disk in frictional engagement with the work end of the hub, the hub being provided with an axial bore and counter bore, said axial bore being provided with bayonet pin slots, said retainer having a concentric cup-shaped projection extending into said counter bore; a headed locking pin extending through the end of said projection into said axial bore and provided with bayonet pins cooperating with the said slots to hold said pin in the hub, said retainer being rotatable relative to said pin, the head of said locking pin being disposed within said projection of the retainer; spring means disposed between the end of said cup-shaped projection and the head of said locking pin to urge said retainer toward the hub end; and a resilient supporting structure for the abrasive disk including an annular backing pad, a resilient disk carried by said hub to which said annular pad is secured, and a stiffening disk bearing on the central portion of said resilient disk on the face opposite said annular pad.

5. An abrasive disk mounting structure for mounting a centrally apertured abrasive disk, having a hub provided with a hollow formation in the work face end thereof, and having a quick release abrasive disk clamping mechanism extending into said hollow formation in the hub and removable therefrom; said clamping mechanism comprising a centrally apertured disk-engaging member, a manually manipulatable plunger having one end extending through the aperture of said member, said member being movable axially relative to said plunger, a compressed spring operatively disposed between the disk-engaging member and the other end of said plunger and urging the said member toward the hub for clamping an abrasive disk against the hub end, and means on the said one end of the plunger for holding the plunger in releasable engagement with the hub; said hub having means in said hollow formation cooperating with the last said means, and the said means on the plunger being adapted to retain said member on the plunger when the disk-engaging member is disengaged from said hub.

6. In an abrasive disk mounting structure having a hub provided with a hollow formation in the work face end thereof, a disk clamping mechanism adapted to clamp a centrally apertured disk in frictionally driven engagement with the hub until a predetermined abrading load is attained by the disk, said mechanism comprising a manually manipulatable plunger having one end extending into said hollow formation, said plunger being provided on said one end with means adapted to engage releasably the hub, a disk-engaging member rotatably mounted on the plunger, and a compressed spring operatively disposed between the disk-engaging member and the plunger to urge the said member toward the hub for clamping an abrasive disk against the hub end, the strength of said spring being chosen to determine at a desired maximum value the torque which may be applied to the abrasive disk.

FRANK L. HOLFORD.

REFERENCES CITED

The following references are of record in the file of this patent:

UNITED STATES PATENTS

| Number | Name | Date |
|---|---|---|
| 252,928 | Buzzell | Jan. 31, 1882 |
| 727,557 | Robinson | May 5, 1903 |
| 732,814 | Arnold | July 7, 1903 |
| 802,136 | Busfield | Oct. 17, 1905 |
| 1,002,845 | Hodskinson | Sept. 12, 1911 |
| 1,587,843 | Koreneff | June 8, 1926 |
| 2,331,861 | Smith | Oct. 12, 1943 |
| 2,501,524 | Jones | Mar. 21, 1950 |
| 2,501,554 | Watson | Mar. 21, 1950 |